UNITED STATES PATENT OFFICE.

REDDIN W. PARRAMORE, OF SOMERVILLE, NEW JERSEY.

COMPOSITION FOR ARTIFICIALLY INDUCING MOLD ACTION IN SOILS.

1,347,401. Specification of Letters Patent. Patented July 20, 1920.

No Drawing. Application filed August 11, 1919. Serial No. 316,765.

*To all whom it may concern:*

Be it known that I, REDDIN W. PARRAMORE, a citizen of the United States, residing at Somerville, in the county of Somerset and State of New Jersey, have invented a new and useful Composition for Artificially Inducing Mold Action in Soils, of which the following is a specification.

This invention relates to a composition of matter designed to fertilize soils by means of the action of a mold growth set up in the soil and propagated and fed by the ingredients contained in said composition. The special aim of the invention is to artificially produce a mold action in soils which will stimulate the growth of plants to the same degree as leaf mold does.

The term "leaf mold" is commonly used to mean the rich black earth-like mass of decayed leaves found in most woods and swamps. It has been thought by many that the fertilizing value of leaf mold was due entirely to the fact that it was rich earth. This, however, is only partially true. Recent investigations have proved that there are hundreds of species of mold, some of which are most powerful agents in destroying celluloses and other carbon compounds. Many inorganic mineral substances are also attacked by molds which build up other compounds available as food for plants. It is the presence of innumerable colonies of mold spores in leaf mold which makes it of remarkable value as a fertilizer.

Inasmuch as the available supply of leaf mold is wholly inadequate to fulfil the requirements of agriculture, I have sought for years to produce in a soil by artificial means the same conditions which follow the introduction of ordinary leaf mold in the ground. In other words, I have endeavored to bring about certain chemical conditions by which mold of a high fertilizing value will be actually produced in the soil.

My experiments have taken a wide range, but it would be impracticable as well as unnecessary to review in this specification the various steps pursued and the results achieved. Suffice it to say that I am enabled to present to the farmer, in a commercial form and at a reasonable price, a composition which is invariable in its results, and which involves no departure from prevailing methods of planting and cultivating.

To accomplish this, I have originated a composition comprising the leaves and stems of immature succulent plants such as beans, peas, etc., which parts of the plants are dried and cured and thereafter ground to a flour or meal-like state, or a near approach thereto, and then mixed with ground commercial phosphates and ground potash, and sometimes other minerals. All material used should be ground to approximately the same degree of fineness. The phosphates and potash are usually sufficient because the other mineral elements are quite commonly found already incorporated in the soil, and it is only in special cases that additional ingredients are needed.

No exact proportions of the ingredients of the composition can be given, nor is it necessary that they should be given, but it is usually advisable to employ the mineral elements and the vegetable flour or meal in approximately equal amounts by weight. With the vegetable flour or meal present, there is no necessity of adding nitrates, although on some occasions nitrates may be employed.

The composition is added to the soil, either by being spread on top of the ground or drilled into the ground by the usual method. This may be done before or after planting, or while cultivating the growing plants. The moisture of the soil and that of subsequent rains will start the propagation of the mold, which mold may be described as like or actually the same as that mold which produces the black earthy mass known as leaf mold. Practically all soils contain the spores of molds, and the composition has in it the necessary materials to start extensive propagation of the mold as soon as moisture comes in contact therewith. The mold grows and spreads with great rapidity, feeding on the materials of the composition and converting the mineral elements into forms particularly adapted to in turn feed and nourish the plants. Furthermore, most soils, and particularly so-called exhausted soils, contain large amounts of potential plant foods, which, in the form usually found, are not available for crops. The mold is particularly well-adapted to release or unlock such potential material and convert it into active plant food, wherefore ground or soil otherwise of no value for crops becomes productive of luxuriant crops.

In the usual method of using fertilizer, it has been the custom to apply phosphates and potash and some form of nitrogen to the soil with the result that a very large proportion of the efficiency of these elements is lost. This is because the various elements dissolve in different proportions and at different times, and when needed by the plants are either not present, or in such form as to be only indifferently utilized by the plants.

With the use of this composition, the conversion of the elements into plant food begins as soon as the moisture of the ground, or that supplied by rains, can operate to start the production of the mold, and such mold, finding an abundance of food in the composition, increases with progressively greater intensity, thus providing at all times a great abundance of ideal plant food on which the plants thrive enormously as shown by the immensely increased production in the crops where the composition is used.

It is to be understood that the invention is not confined to any particular vegetable matter, but is to include any vegetable matter which will, in the presence of moisture, induce mold action for the purpose of artificial propagation thereof. While beans and peas, which are leguminous plants, were mentioned above as examples of the succulent plants which might be used to make the vegetable meal, there are scores of plants of a succulent nature which are not leguminous but which may be used successfully in my composition. On the other hand, there are concentrates or processed vegetable matter, such for instance as oil cake which are valuable for their mineral or nitrogen contents and may be used to feed the mold, but which must be classed as "dead wood" in its propagation.

When a growing plant is budding or in full blossom, its combined economic value and efficiency for propagating mold is highest or at the maximum. Woody matter such as sawdust, or fibrous matter such as corn husks, represent the extremes of inefficiency, being in face useless for mold propagation. Mold action seems to depend upon the very first stages of decay and is most active on immatured vegetable matter, which offers least resistance.

I believe that I am the first to produce mold artificially to be used in connection or combined with mineral salts as a complete commercial fertilizer. The vegetable meal is an active component part of the fertilizer. It is not included or added as a filler and contains no inert matter or "dead wood."

The mold will not be of economic value without the vegetable meal and the minerals both being present at the same time. The mold propagated by the vegetable meal is only of value when given the mineral matter to act upon to produce compounds available to plants as food. The component parts of my fertilizer are thus mutually dependent upon each other to attain the object of my invention, viz., the artificial production in soils of a mold action of a character highly stimulating to cultivated plant life.

What is claimed is:—

1. A mold forming and propagating composition for fertilizing purposes, comprising a vegetable meal formed from succulent plants, said meal being mixed with ground inorganic fertilizing material.

2. A mold forming and propagating composition for stimulating the fertility of soils, comprising a mixture of ground inorganic fertilizing material with a vegetable meal, said vegetable meal being made from the stems and leaves of succulent plants.

3. A mold forming and propagating composition for stimulating the fertility of soils, comprising a mixture of ground inorganic fertilizing material with a vegetable meal, said vegetable meal being made from succulent plants taken while in a live state and dried and ground.

4. A mold forming and propagating composition for fertilizing purposes, comprising a vegetable meal made from dried and ground leaves and stems of green or immature plants, mixed with ground inorganic fertilizing material.

5. A mold forming and propagating composition for stimulating the fertility of soils, comprising a mixture of ground inorganic fertilizing material with a vegetable meal, said vegetable meal being made from succulent plants taken while immature and dried and ground.

6. A mold forming and propagating composition for stimulating the fertility of soils, comprising a mixture of ground mineral fertilizing material with a vegetable meal, said vegetable meal being made from the stems and leaves of succulent leguminous plants taken in an immature condition and dried and ground.

7. A mold forming and propagating composition for stimulating the fertility of soils, comprising a mixture of mineral fertilizers with a vegetable meal, the mineral fertilizers comprising ground phosphates and ground potash, the vegetable meal being made from succulent leguminous plants taken in an immature condition and dried and ground, the vegetable and mineral components being in substantially equal parts by weight and being ground to a substantially equal degree of fineness.

In testimony that I claim the foregoing as my own, I have hereto affixed my signature.

REDDIN W. PARRAMORE.

Witnesses:
J. T. STRYKER,
JOHN W. WHITENACK.